UNITED STATES PATENT OFFICE.

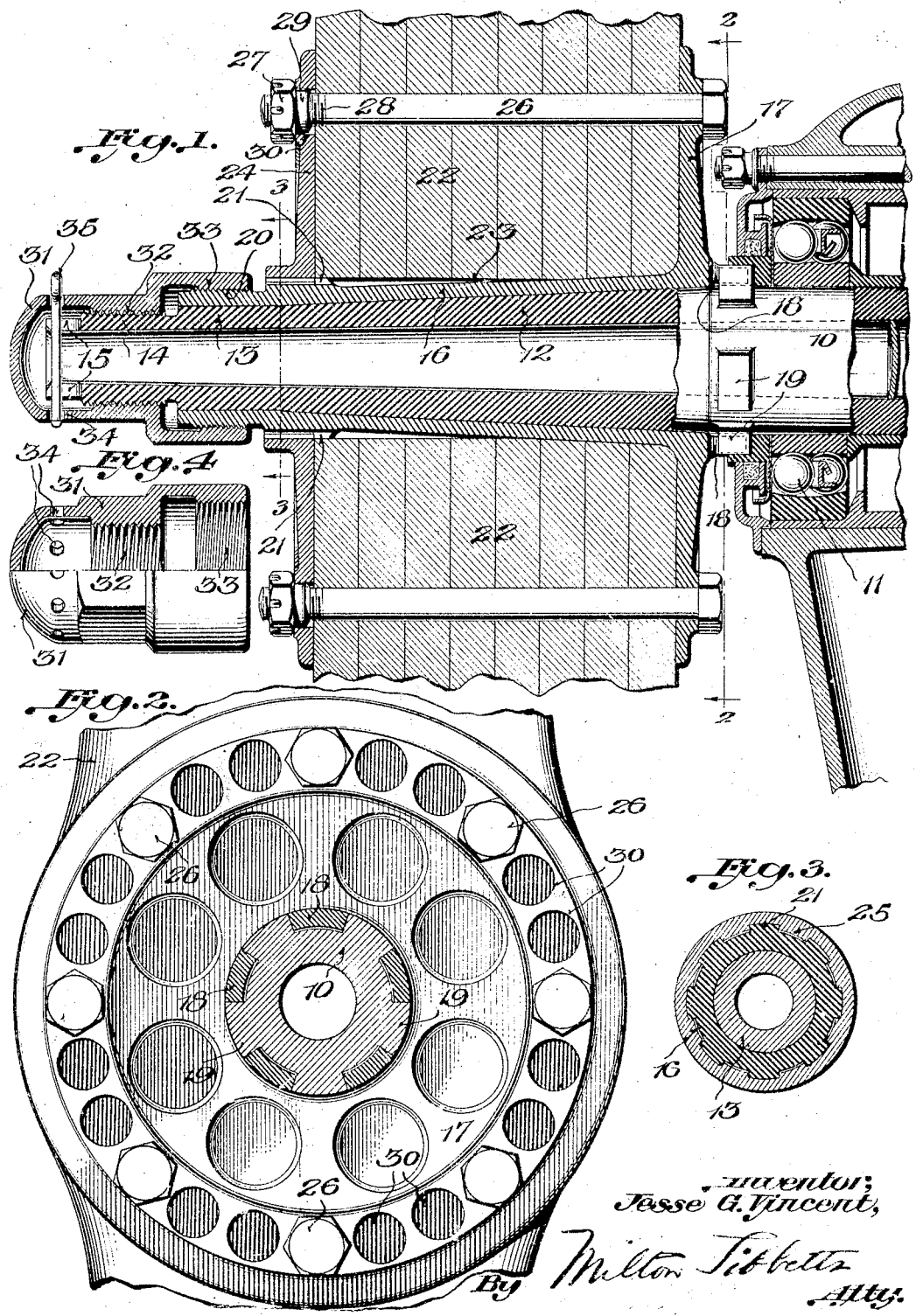

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

DETACHABLE-AIRCRAFT-PROPELLER HUB.

1,406,251. Specification of Letters Patent. Patented Feb. 14, 1922.

Application filed September 26, 1918. Serial No. 255,876.

*To all whom it may concern:*

Be it known that I, JESSE G. VINCENT, a citizen of the United States, and residing at Detroit, Wayne County, State of Michigan, have invented certain new and useful Improvements in Detachable-Aircraft-Propeller Hubs, of which the following is a specification.

The present invention relates to aircraft and more particularly to a detachable propeller.

The principal objects of the invention are to provide a construction wherein the propeller is secured to the driving shaft for easy and quick removal; to provide a means to force the propeller to its seat on the drive shaft; to provide means to positively withdraw the propeller from the driving shaft; and to provide a novel hub which is constructed to permit the propeller blades to be quickly removed therefrom. Other objects and features of novelty will be apparent from the description taken in connection with the drawings, in which:—

Figure 1 is a longitudinal sectional elevation through the end portion of a propeller shaft and illustrating the inner or hub portion of a propeller mounted thereon;

Figure 2 is a sectional elevation taken substantially on the line 2—2 of Figure 1;

Figure 3 is a sectional elevation taken substantially on the line 3—3 of Figure 1 and looking in the direction indicated by the arrows;

Figure 4 is a half section and half elevation of the nut associated with the ends of the propeller shaft and hub.

Referring to the drawings, the numeral 10 indicates the propeller or driving shaft of an aircraft, one of the bearings for supporting the same being shown at 11. Preferably the shaft is hollow and is formed with the conical portion 12 which tapers down to a short cylindrical portion 13 and the end of the shaft is somewhat reduced in diameter and threaded as at 14. The tip end may be formed with the slots 15 for a purpose presently to be described.

The hub of the propeller which is adapted to be mounted on the drive shaft for easy removal comprises a conical sleeve portion 16 adapted to fit on the conical portion 12 of the shaft. At its inner end this sleeve has the radially extending flange 17 which as shown is integral therewith, and is also formed with a circular series of axially projecting lugs 18. These lugs are designed to fit between a circular series of radially projecting lugs 19 formed on the shaft at the base of the conical portion thereof. The opposite end of the propeller hub is formed with a cylindrical portion 20 adapted to fit on the cylindrical part 13 of the shaft, this portion being exteriorly threaded. At the small end of the conical part 16 of the hub, the periphery thereof is provided with a circular series of radial projections or keys 21, the outside radius of these projections being less than the radius of the conical part of the hub at the base thereof, so that the hub portion of the propeller blades 22 may pass over these projections and the bore 23 thereof have a bearing or seat on the said conical part 16 of the hub. A radially projecting flange 24 has a bore formed with inwardly projecting lugs or keys 25 designed to fit between the lugs 21 on the hub. In this manner the flange 24 is removably mounted on the hub and yet is constrained to rotate therewith by means of the splined or key construction between its inner periphery and the hub. The inner or hub part of the propeller blades 22 is clamped and secured between the flanges 17 and 24 by means of the bolts 26, which extend through the flanges and the hub part 22. The nuts 27 on the threaded part 28 of these bolts are formed with the reduced cylindrical ends 29 which are designed to fit in the apertures 30 so that the thread on the bolts will not be injured.

The present invention also includes means for forcing the propeller onto the driving shaft and means for positively withdrawing the said hub. As illustrated, a nut 31 is provided with the two threaded parts 32 and 33, the part 32 being of coarser pitch than the part 33 and designed to be associated with the thread on the end of the shaft while the finer pitch thread 33 cooperates with the thread on the end of the propeller hub. It will be apparent, because of the difference in the pitches of these two threads, that screwing on the nut 31 will cause the hub to be forced on to the driving shaft, thereby securely fitting the conical sleeve 23 of the hub on the conical part 12 of the shaft. It often occurs that these parts become rusty or "frozen" together so that it is a very difficult matter to withdraw the hub from the shaft. In the present instance it will be observed that rotation of the nut 31 in a direction to unscrew the same will positively withdraw the hub from the shaft. Consequently, it is an easy matter to dismount a propeller constructed and mounted as disclosed herein. The end of the nut may be formed with the apertures 34 for a cotter pin 35 which passes through the apertures and engages the slots 15 in the end of the shaft. It is apparent further that the propeller blades may be easily removed from the propeller hub, as it is merely necessary to unscrew the nuts 27 and pull off the blades, the flange 24 of course being pulled off together with the blades.

Although a specific construction has been described, it is to be understood that the invention is not limited to the exact details shown but includes changes and modifications which come within the scope of the appended claims.

Having thus described the invention what is claimed as new and desired to be secured by Letters Patent is:

1. In an aircraft construction in combination, a driving shaft, a propeller having a hub mounted on said shaft, one of said parts at the inner end of the hub having axially projecting lugs adapted to engage in recesses in the other part, and means at the outer end of the hub to secure the hub against axial movement on the shaft.

2. In an aircraft construction, in combination, a driving shaft having a pair of circumferentially spaced radially projecting lugs, a propeller hub mounted on said shaft having an axial projection at one end disposed between said lugs and means on the shaft coacting with the opposite end of said hub to force the hub toward said lugs.

3. In an aircraft construction, in combination, a driving shaft having a conical end portion and a pair of circumferentially spaced radially projecting lugs at the base of said portion, a hub on said portion having a projection at one end disposed between said lugs, a nut at the other end having two threaded parts of different pitch, one of said parts being associated with a threaded portion on the hub, and the other with a threaded portion on the shaft, whereby rotation of the nut forces the hub along the shaft.

4. In an aircraft construction, in combination, a driving shaft, a propeller having a hub mounted on said shaft, one of said parts at the inner end of the hub having axially projecting lugs adapted to engage in recesses in the other part, said shaft projecting from the outer end of the hub and having its end portion threaded, and the outer end of the hub portion also being threaded, the pitch of the hub thread being less than the pitch of the shaft thread, and a nut having two threaded parts each adapted to cooperate with one of the threaded parts of the hub and shaft to force the hub to its seat on the shaft or withdraw it therefrom, and means to lock the nut against rotation relative to said parts.

In testimony whereof I affix my signature.

JESSE G. VINCENT.